(12) United States Patent
Martella et al.

(10) Patent No.: US 12,360,873 B2
(45) Date of Patent: Jul. 15, 2025

(54) DISTRIBUTED TRACING LEVERAGING EVENT LOGS

(71) Applicant: AT&T Intellectual Property I, L.P., Atlanta, GA (US)

(72) Inventors: Arthur Martella, Morris Plains, NJ (US); Saumya Swarup Pattanayak, Parlin, NJ (US); Clifford Weiss, East Windsor, NJ (US); Abbas Munawar Fazal, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 127 days.

(21) Appl. No.: 17/974,573

(22) Filed: Oct. 27, 2022

(65) Prior Publication Data

US 2024/0143471 A1 May 2, 2024

(51) Int. Cl.
| | |
|---|---|
| G06F 15/173 | (2006.01) |
| G06F 11/07 | (2006.01) |
| G06F 11/30 | (2006.01) |
| G06F 11/32 | (2006.01) |
| G06F 11/34 | (2006.01) |
| H04L 41/06 | (2022.01) |
| H04L 43/045 | (2022.01) |

(52) U.S. Cl.
CPC ...... *G06F 11/3072* (2013.01); *G06F 11/0775* (2013.01); *G06F 11/323* (2013.01); *G06F 11/3476* (2013.01); *H04L 41/06* (2013.01); *H04L 43/045* (2013.01)

(58) Field of Classification Search
CPC .... H04L 41/06; H04L 43/045; G06F 11/3072; G06F 11/0775; G06F 11/323; G06F 11/3476

USPC .......................................................... 709/224
See application file for complete search history.

(56) References Cited

U.S. PATENT DOCUMENTS 10,282,268 B1 * 5/2019 Cherian .............. G06F 11/3636
10,397,343 B1 * 8/2019 Goldberg ............ H04L 67/1097
(Continued)

OTHER PUBLICATIONS

Google. "Finding and viewing traces". Jun. 30, 2020. pp. 1-8. (Year: 2020).*

(Continued)

*Primary Examiner* — Imad Hussain
(74) *Attorney, Agent, or Firm* — Hartman & Citrin LLC

(57) ABSTRACT

A flow logging utility tracer ("FLUTE") system can present a FLUTE user interface through which the FLUTE system can receive a trace request. The FLUTE system can interface, via a FLUTE controller, with a FLUTE adapter corresponding to a cloud environment associated with the trace request. The FLUTE adaptor can extract event log data from a log repository corresponding to the cloud environment. The FLUTE adapter can filter the event log data according to a logging specification. The FLUTE adapter can transform the filtered event log data for compatibility with a FLUTE stitcher. The FLUTE stitcher can generate tracing data based upon the event log data. The FLUTE stitcher can correlate the tracing data based upon a common identifier enforced by the logging specification, prepare the tracing data for publication to a distributed tracing system, and publish the tracing data to the distributed tracing system for storage.

20 Claims, 7 Drawing Sheets

(56) References Cited

U.S. PATENT DOCUMENTS

| | | | |
|---|---|---|---|
| 11,704,219 B1* | 7/2023 | Lerner | G06F 11/327 |
| | | | 714/57 |
| 2009/0043825 A1* | 2/2009 | Bourne | G06F 16/14 |
| 2018/0203795 A1* | 7/2018 | Gadiya | G06F 11/3612 |
| 2020/0218586 A1* | 7/2020 | Aghadavoodi Jolfaei | ............... |
| | | | H04L 67/02 |
| 2021/0303565 A1* | 9/2021 | Blackwood | G06F 16/248 |
| 2023/0033202 A1* | 2/2023 | Dhammawat | H04L 67/146 |

OTHER PUBLICATIONS

Hansen. "Monitoring Microservice-Based Cloud Applications Using Distributed Tracing". Mar. 9, 2020. pp. 1-6 (Year: 2020).*

* cited by examiner

DISTRIBUTED TRACING LEVERAGING EVENT LOGS

BACKGROUND

Network functions virtualization ("NFV") is a technology initiative that aims to move traditional and evolving networking functions, such as access network elements, core network elements, transport network elements, and others, from purpose-built hardware to commercial-off-the-shelf ("COTS") server-based platforms. This is achieved through virtualization of mobility networking functions to create virtual networking functions ("VNFs") that operate on COTS hardware.

A software-defined network ("SDN") provides a software-centric cloud environment for creating intelligent networks that are programmable, application aware, and more open than traditional hardware-based network architectures. SDN provides an agile and cost-effective communications platform for handling the dramatic increase in data traffic on carrier networks by providing a high degree of scalability, security, and flexibility. SDN provides several benefits over traditional networks. SDN allows for the creation of multiple virtual network control planes on common hardware. SDN helps extend service virtualization and software control into many existing network elements. SDN enables applications to request and manipulate services provided by the network and to allow the network to expose network states back to the applications. SDN exposes network capabilities through application programming interfaces ("APIs"), making the control of network equipment remotely accessible and modifiable via third-party software clients using open protocols such as OpenFlow, available from Open Network Forum ("ONF").

Combining SDN and NFV functionality provides a highly complex and dynamic set of relationships between virtual, logical, and physical resources. Networks provide intelligent software systems and applications operating on general purpose commodity hardware (e.g., COTS). Within service providers, such as AT&T, orchestration systems like Enhanced Control, Orchestration, Management, and Policy ("ECOMP") systems have been created to dramatically reduce monotonous tasks and monitoring required by human operators through data-based analytics. AT&T's ECOMP has been combined with the Open Orchestrator Project ("OPEN-O") to create the Open Network Automation Platform ("ONAP") project supported by the Linux Foundation. ONAP is an open source software platform that delivers capabilities for the design, creation, orchestration, monitoring, and life cycle management of SDNs and the VNFs operating therein, as well as higher-level services that utilize the functionality of SDN/VNF. ONAP provides automatic, policy-driven interaction of these functions and services in a dynamic, real-time cloud environment. ONAP also provides graphical design tools for function/service creation.

Observability measures how well one can understand the internal states of a system based upon its external outputs. Observability uses various instrumentation techniques to provide insights that aid in monitoring. Currently, some of the major observability platforms in the industry are Jaeger, Zipkin and OpenTelemetry. These libraries are based on specifications such as OpenTracing and OpenTelemetry. Various instrumentation techniques, such as manual instrumentation, automatic instrumentation, or instrumentation through a sidecar proxy, are available to implement these libraries and software development kits ("SDKs"). When it comes to implementation, however, each of these instrumentation techniques presents its own challenges. There needs to be at least some level of either code or configuration changes to instrument the application for collecting various telemetry data. Typically, when working with complex distributed systems based on a multi-language microservices architecture, implementation of such instrumentation libraries either at application level or at platform level is a more difficult challenge. Some of the challenges of using instrumentation techniques include, for example, the following: the additional development and operation costs for each individual application that is part of the traceability requirement; the programming language dependencies and the fact that not all programming languages are currently supported by instrumentation libraries; the time to market because any new services introduced are subject to the processes of including instrumentation and end-to-end testing, which can be aggravated by one or more dependencies on other implementations from other services; capturing traces for asynchronous flow; and capturing custom context information that may cost extra performance overhead. Typically, when a request or transaction flows through multiple microservices, flows through multiple cloud data centers or regions, and interacts with applications implemented through multiple programming languages, it is extremely difficult to achieve distributed traceability requirements using instrumentation.

SUMMARY

Concepts and technologies disclosed herein are directed to distributed tracing leveraging event logs. According to one aspect disclosed herein, a flow logging utility tracer ("FLUTE") system can include a processor and a memory. The memory can include instructions that, when executed by the processor, cause the FLUTE system to perform operations. In particular, the FLUTE system can present a FLUTE user interface through which the FLUTE system can receive a trace request. The FLUTE system can interface, via a FLUTE controller, with a FLUTE adapter corresponding to a cloud environment that is associated with the trace request. The FLUTE system can extract, via the FLUTE adapter, event log data from a log repository corresponding to the cloud environment associated with the trace request. The FLUTE system can generate, via a FLUTE stitcher, tracing data based upon the event log data.

In some embodiments, the FLUTE system can filter, via the FLUTE adapter, the event log data according to a logging specification. The logging specification can be an ECOMP logging specification or another logging specification. The FLUTE system can transform, via the FLUTE adapter, the filtered event log data for compatibility with a FLUTE stitcher. The FLUTE stitcher can correlate the tracing data based upon a common identifier enforced by the logging specification. The FLUTE stitcher can prepare the tracing data for publication to a distributed tracing system. The FLUTE stitcher can then publish the tracing data to the distributed tracing system for storage.

The FLUTE user interface can enable a user to obtain the tracing data from the distributed tracing system. The FLUTE user interface can present a visualization of the tracing data. The visualization can include a directed acyclic graph. The tracing data can include at least one trace, and the at least one trace can include at least one span. The directed acyclic graph can represent the at least one trace and any spans.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
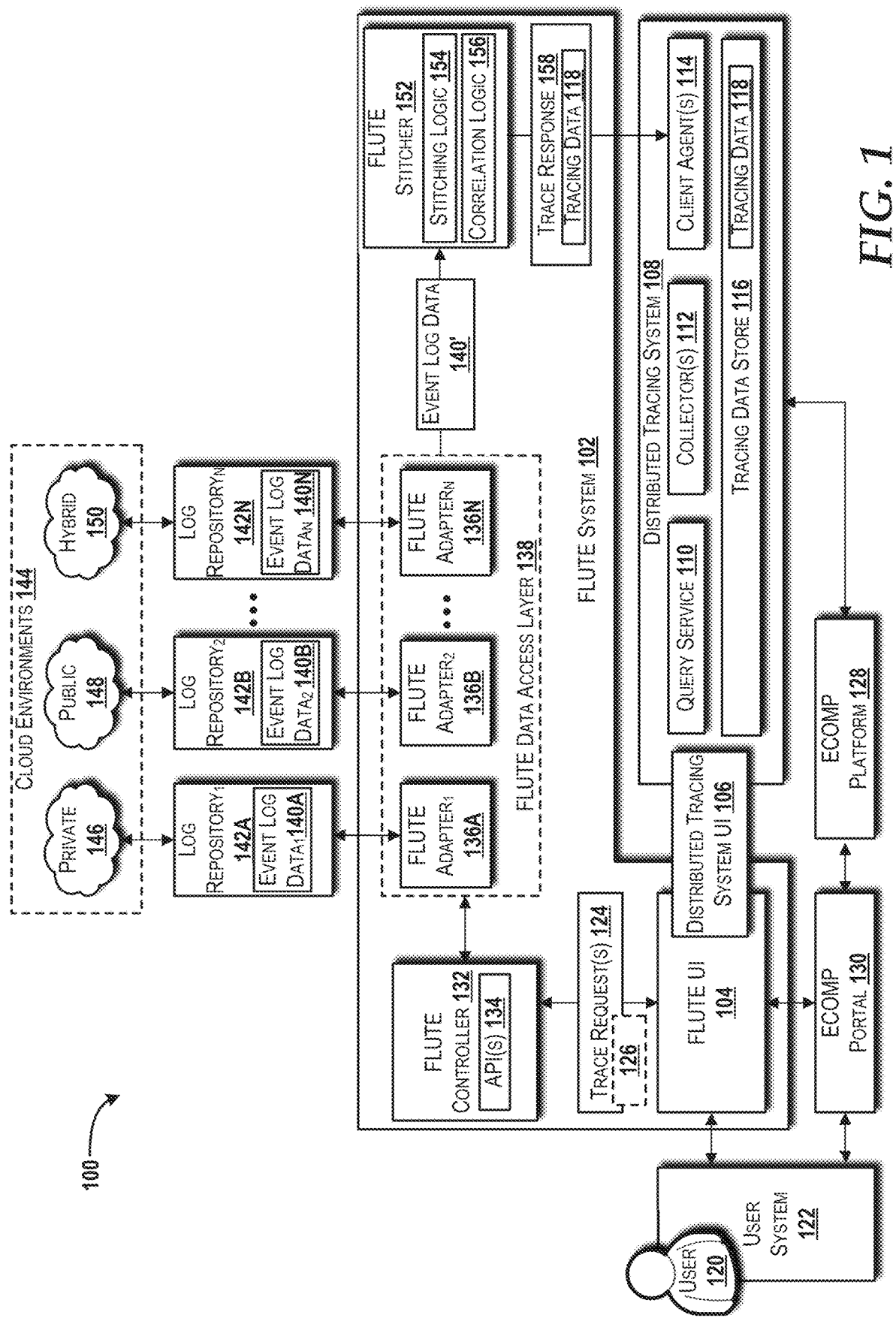
FIG. 1 is a block diagram illustrating aspects of an illustrative operating environment for various concepts and technologies disclosed herein.

The following detailed description provides a solution to the aforementioned challenge via an improved method for introducing observability, including transaction tracing, into a distributed software system, for visualization and analysis. Typically, this requires observing a series of events sent and received as part of a single transaction of a distributed application, generating a probabilistic model of a request flow from observed events of the distributed software system, and constructing a call flow, based on the probabilistic model for the distributed application, that shows all the relationships across microservices. The disclosed method does not need any kind of instrumentation to collect various events, rather events can be collected from event logs generated by applications based on an agreed upon specification. Thus, the novel method disclosed herein can prepare a traceability model without any code instrumentation and without any application dependencies by correlating the events logs based on a common identifier. This solution also allows operations teams to collect event logs efficiently from various clouds (e.g., public, private, and/or hybrid) participating in a single transaction at near real-time. The prepared trace data also can be compared with a predictive model defined in the distributed software system to understand the variance, and accordingly, signal to an alerting system for corrective measures.

The purpose of logging in a distributed microservices architecture is to capture information needed to operate, troubleshoot, and report on the performance of the platform and its constituent components. The processing of, and possibly response to, a client request often involves multiple platform components and/or subcomponents. The ability to track such processing flows across components is needed to understand the platform's behavior and performance. A mature and well-architected system of this type will use a universally unique value in log records to track the processing of every client request across all of the components involved in its processing. Whatever form this identifier takes, it can be used to thread together logs from microservices that may span across multiple data centers and/or clouds. The proposed solution leverages the logging specification implemented by the platform's sub-systems that generate various types of event logs. These event logs are classified into four standard types: audit, metrics, error, and application. All incoming request events are captured in audit logs whereas outgoing events are captured in metrics logs. The locations of log repositories are based on where the component or sub-system is deployed. Some components may exist in on-premises private cloud, and some other components may exist in a public cloud like MICROSOFT AZURE or AMAZON WEB SERVICES. Irrespective of the log location, the proposed solution extracts the logs from the configured log location and generates traces using a standardized tool, such as a Jaeger client library. All Jaeger client libraries support the OpenTracing APIs. Jaeger client libraries adhere to the data model described in the OpenTracing standard. With this proposed approach, there will be no change in application code or configuration. The only requirement for the application is that the application is configured to comply with a global logging specification, which the application should be doing anyway.

There are many benefits to introducing observability tools into a distributed microservice platform. These benefits, however, are frequently offset by the expense of code and configuration changes associated with application instrumentation. The disclosed solution achieves the traceability requirement without any application instrumentation. There are no changes in any code or in any configuration file. In addition, there is zero performance impact because the proposed solution runs as an independent isolated process that works on event logs. Correlation and stitching logics can be built using open source tools, such as the Jaeger client library, which is an implementation of the OpenTracing API. OpenTracing is an open-source CNCF project that provides vendor-neutral APIs and instrumentation for distributed tracing. These tools have zero licensing cost. This solution can contain powerful role-based access controls to limit access to sensitive logs and prevent unauthorized actions. Moreover, this solution is highly scalable, based on an extendable design, and has easy maintainability and agility. This solution also is capable of handling synchronous and asynchronous call flows seamlessly. It can provide probable root cause identification on application performance problems and the impact thereof on business outcomes. Domain-agnostic analytics capabilities for integrating data from third-party sources allow operations teams to continuously discover and collect observability data in a fast and automated fashion, which leads to faster time to value. As the triaging time improves for any kind of performance bottlenecks, the operation cost improves over time. This solution can supplement an instrumented solution as well. Instrumented solutions almost always use sampling, where only a small percentage of calls are recorded, in order to be able to monitor system performance without impacting it significantly. If an operations team is searching for a specific transaction, the odds of that one being sampled are small. A log-based system can retrieve the specific transaction on demand, which a sampled system cannot do.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Turning now to FIG. 1, an operating environment 100 in which embodiments of the concepts and technologies disclosed herein can be implemented will be described. The operating environment 100 includes a flow logging utility tracer ("FLUTE") system 102 that provides a FLUTE user interface ("UI") 104 designed to function on top of a distributed tracing system UI 106 of a distributed tracing system 108. The distributed tracing system 108 can be implemented via OpenTelemetry, which provides a collection of tools, APIs, and SDKs to instrument, generate, collect, and export telemetry data (e.g., metrics, logs, and traces) to aid in the analysis of software performance and behavior. The distributed tracing system 108 can be implemented via other open source software, such as Jaeger (superseded by OpenTelemetry). Those skilled in the art will appreciate the applicability of the concepts and technologies disclosed herein to future versions of OpenTelemetry and similar software. Moreover, although open source software is specifically described herein to implement the distributed tracing system 108, proprietary software is also contemplated, although the use of proprietary software would increase the costs associated with deployment and management of the FLUTE system 102.

The illustrated distributed tracing system 108 includes a query service 110, one or more collectors 112, one or more client agents 114, and a tracing data store 116 that can store tracing data 118 from previous traces. The query service 110 can retrieve at least a portion of the tracing data 118 from the tracing data store 116 upon request received via the distributed tracing system UI 106. The client agent(s) 114 can receive the tracing data 118 as output from the FLUTE system 102. The client agent(s) 114 can publish the tracing data 118 to the collector(s) 112, which, in turn, can validate, clean-up, enrich, and/or otherwise process the tracing data 118 prior to storing the tracing data 118 in the tracing data store 116.

A user 120 can access the FLUTE system 102 via the FLUTE UI 104 to perform various tasks. In the illustrated example, the user 120 accesses the FLUTE system 102 via a user system 122, such as a computer system (example shown in FIG. 3), a mobile device (example shown in FIG. 6), or the like, which can be directly connected to the FLUTE system 102 or connected to the FLUTE system 102 via one or more networks (example shown in FIG. 5). The user 120 additionally or alternatively may interact directly with the FLUTE system 102. As such, the FLUTE system 102 may include one or more input/output devices such as a keyboard, a mouse, and a display, for example. The FLUTE UI 104, in combination with the distributed tracing system UI 106, can enable the user 120 to search the tracing data 118 stored in the tracing data store 116, generate new traces via one or more trace requests 124 based upon request/transaction IDs 126, compare two or more traces, analyze service dependencies, analyze service latencies, and analyze errors. The FLUTE UI 104 may facilitate additional and/or alternative tasks not explicitly disclosed herein.

Along with the open source codebase (e.g., OpenTelemetry or Jaeger) provided by the distributed tracing system 108, the FLUTE user interface 104 also can utilize an open source ECOMP SDK that can provide reusable UI components, authentication and authorization components, visualization and reporting engine components, collaborative services, workflow manager, web component, and widget development framework for the FLUTE UI 104 to access an ECOMP platform 128 via an ECOMP portal 130.

The FLUTE system 102 also includes a FLUTE controller 132 that provides one or more API(s) 134 for generating traces based upon the request/transaction IDs 126 provided in the trace requests 124. The request/transaction IDs 126 can be ECOMP logging RequestID values used to track the processing of client requests through ONAP components involved in processing the corresponding request. The API(s) 134 can be called by the FLUTE UI 104 or from any stand-alone REST client (not shown). The FLUTE controller 132 can invoke trace generation processes synchronously, asynchronously, or both synchronously and asynchronously. Authentication and authorization decisions can be made by the FLUTE controller 132, which can be programmed with appropriate decision logic to handle these decisions. In response to the trace request(s) 124, the FLUTE controller 132 can utilize the appropriate API(s) 134 to interact with one or more FLUTE adapters 136A-136N (referred to collectively as "FLUTE adapters 136" or individually as "FLUTE adapter 136") operating as part of a FLUTE data access layer 138.

The FLUTE data access layer 138 is designed based upon a pluggable adaptor architecture through which the FLUTE adapters 136A-136N can extract event log data 140A-140N (referred to collectively as "event log data 140 or individually as "event log data 140") from various log repositories 142A-142N (referred to collectively as "log repositories 142" or individually as "log repository 142"), respectively. The log repositories 142 can include raw log repositories, MICROSOFT AZURE log analytics workspace repositories, Splunk repositories, Elasticsearch repositories, combinations thereof, and/or the like. Each of the log repositories 142 can be associated with one or more cloud environments 144. In the illustrated example, the log repository$_1$ 142A collects the event log data$_1$ 140A from a private cloud environment 146; the log repository$_2$ 142B collects the event log data$_2$ 140B from a public cloud environment 148, and the event log repository$_N$ 142N collects the log data$_N$ 140N from a hybrid cloud environment 150. The FLUTE adapters 136 can filter and transform the event log data 140 per ECOMP logging specification(s) implemented by the ECOMP platform 128 (or other specification) before sending filtered and transformed event log data 140' to a FLUTE stitcher 152.

The FLUTE stitcher 152 can execute stitching logic 154 and correlation logic 156 implemented, for example, through an open source client library (e.g., OpenTelemetry or Jaeger) to generate spans and traces out of the event log data 140' obtained from various FLUTE adapters 136 and to correlate the event log data 140' to specific request(s) 124 based on a common identifier (e.g., the request/transaction ID 126) enforced by the ECOMP logging specification (or other specification). Alternatively, the stitching logic 154 and the correlation logic 156 can be implemented through the OpenTelemetry SDK. A span represents a logical unit of work that has an operation name, a start time of the operation, and a duration of the operation. A span may be nested and ordered to model causal relationships. A trace represents the data or execution path through a system. A trace can be viewed as a directed acyclic graph of spans The FLUTE stitcher 152 can publish spans and traces as tracing data 118 that is part of one or more trace response(s) 158 corresponding to the trace request(s) 124. In particular, the FLUTE stitcher 152 can output the tracing data 118 to the client agent(s) 114, which can further publish the tracing data 118 to the collector(s) 112. The collector(s) 112 can then store the tracing data 118 in the tracing data store 116. The user 120 can then access the tracing data 118 via the FLUTE UI 104.

Figure 2:
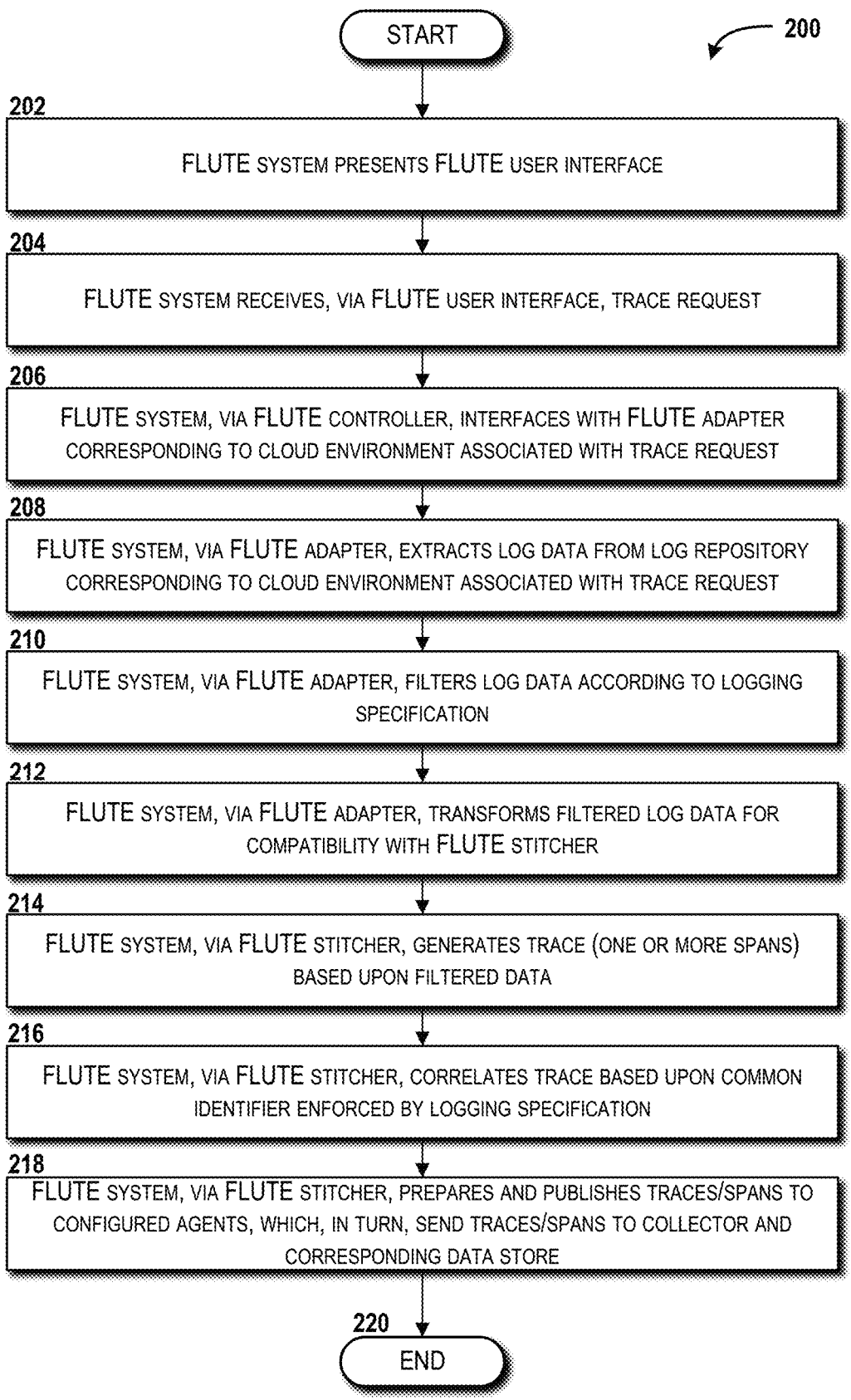
FIG. 2 is a flow diagram illustrating aspects of a method for distributed tracing leveraging event logs, according to an illustrative embodiment of the concepts and technologies disclosed herein.

Turning now to FIG. 2, a flow diagram illustrating aspects of a method 200 for distributed tracing leveraging event logs will be described, according to an illustrative embodiment of the concepts and technologies disclosed herein. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, or a portion thereof, to perform one or more operations, and/or causing the processor to direct other components of the computing system or device to perform one or more of the operations.

For purposes of illustrating and describing the concepts of the present disclosure, operations of the method disclosed herein are described as being performed alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins and proceeds to operation 202. At operation 202, the FLUTE system 102 presents the FLUTE UI 104. From operation 202, the method 200 proceeds to operation 204. At operation 204, the FLUTE system 102 receives, via the FLUTE UI 104, a trace request 124 that includes a common identifier (e.g., the request/transaction ID 126) enforced by the ECOMP logging specification (or other specification). The FLUTE system 102 then routes the trace request 124 to the FLUTE controller 132.

From operation 204, the method 200 proceeds to operation 206. At operation 206, the FLUTE system 102, via the FLUTE controller 132, interfaces with the FLUTE adapter(s) 136 corresponding to the cloud environment(s) 144 associated with the trace request 124. From operation 206, the method 200 proceeds to operation 208. At operation 208, the FLUTE system 102, via the FLUTE adapter(s) 136, extracts, from one or more of the log repositories 142, the event log data 140 corresponding to the cloud environment(s) 144 associated with the trace request 124. From operation 208, the method 200 proceeds to operation 210. At operation 210, the FLUTE system 102, via the FLUTE adapter(s) 136, filters the event log data 140 according to the ECOMP logging specification (or other specification). From operation 210, the method 200 proceeds to operation 212. At operation 212, the FLUTE system 102, via the FLUTE adapter(s) 136, transforms the event log data 140 (shown as event log data 140' in FIG. 1) for compatibility with the FLUTE stitcher 152.

From operation 212, the method 200 proceeds to operation 214. At operation 214, the FLUTE system 102, via the FLUTE stitcher 152, generates the tracing data 118 based upon the event log data 140'. The tracing data 118 can include a trace corresponding to the trace request 124. The trace can include one or more spans. From operation 214, the method 200 proceeds to operation 216. At operation 216, the FLUTE system 102, via the FLUTE stitcher 152, correlates the trace based upon the common identifier (e.g., the request/transaction ID 126) enforced by the ECOMP logging specification (or other specification). From operation 216, the method 200 proceeds to operation 218. At operation 218, the FLUTE system 102, via the FLUTE stitcher 152, prepares and publishes the tracing data 118 (traces/spans), via the trace response 158, to the client agent(s) 114 of the distributed tracing system 108. The client agent(s) 114, in turn, sends the tracing data 118 to the collector(s) 112, which store the tracing data 118 in the tracing data store 116. The tracing data 118 can then be accessed by the user 120, via the FLUTE UI 104 or directly via the distributed tracing system UI 106, such as to view the tracing data 118 as a directed acyclic graph of one or more spans.

From operation 218, the method 200 can proceed to operation 220. The method 200 can end at operation 220.

Figure 3:
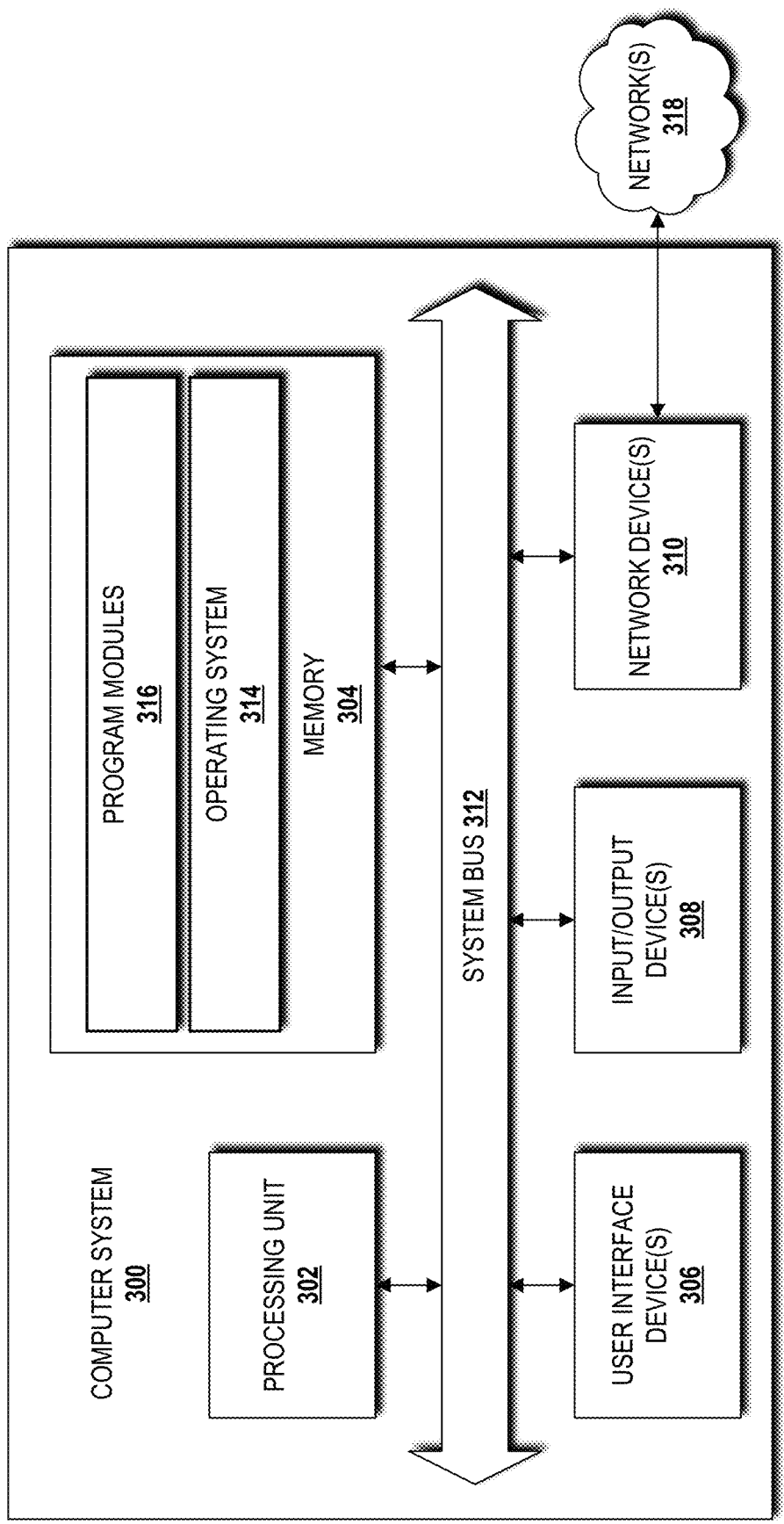
FIG. 3 is a block diagram illustrating an exemplary computer system capable of implementing, at least in part, aspects of the concepts and technologies disclosed herein.

Turning now to FIG. 3, a block diagram illustrating a computer system 300 configured to provide the functionality in accordance with various embodiments of the concepts and technologies disclosed herein. The systems, devices, and other components disclosed herein, such as the user system 122, the FLUTE system 102 or components thereof, the distributed tracing system 108 or components thereof, components of the cloud environments 144, components of the ECOMP platform 128, or some combination thereof can be implemented, at least in part, using an architecture that is the same as or similar to the architecture of the computer system 300. It should be understood, however, that modification to the architecture may be made to facilitate certain interactions among elements described herein.

The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 304 communicates with the processing unit 302 via the system bus 312. In some embodiments, the memory 304 is operatively connected to a memory controller (not shown) that enables communication with the processing unit 302 via the system bus 312. The illustrated memory 304 includes an operating system 314 and one or more program modules 316. The operating system 314 can include, but is not limited to, members of the WINDOWS family of operating systems from MICROSOFT CORPORATION, the LINUX family of operating systems, the MAC OS, OS X, and/or iOS families of operating systems from APPLE CORPORATION, other operating systems, and the like. The program modules 316 may include various software and/or program modules to perform the various operations described herein. According to embodiments, the program modules 316 may be embodied in hardware, software, firmware, or any combination thereof By way of example, and not limitation, computer-readable media may include any available computer storage media or communication media that can be accessed by the computer system 300. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300. In the claims, the phrase "computer storage medium," "computer-readable storage medium," and variations thereof does not include waves or signals per se and/or communication media, and therefore should be construed as being directed to "non-transitory" media only.

The user interface devices 306 may include one or more devices with which a user accesses the computer system 300. The user interface devices 306 may include, but are not limited to, computers, servers, PDAs, cellular phones, or any suitable computing devices. The I/O devices 308 enable a user to interface with the program modules 316. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer. In some embodiments, the I/O devices 308 can be used for manual controls for operations to exercise under certain emergency situations.

The network devices 310 enable the computer system 300 to communicate with other networks or remote systems via one or more networks 318, such as one or more networks associated with the cloud environment(s) 144, a network 500 illustrated and described with reference to FIG. 5, combinations thereof, and/or the like. Examples of the network devices 310 include, but are not limited to, a modem, a radio frequency ("RF") or infrared ("IR") transceiver, a telephonic interface, a bridge, a router, or a network card. The network 318 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 318 may be or may include a wired network such as, but not limited to, a Wide Area Network ("WAN"), a wired Personal Area Network ("PAN"), or a wired Metropolitan Area Network ("MAN").

Figure 4:
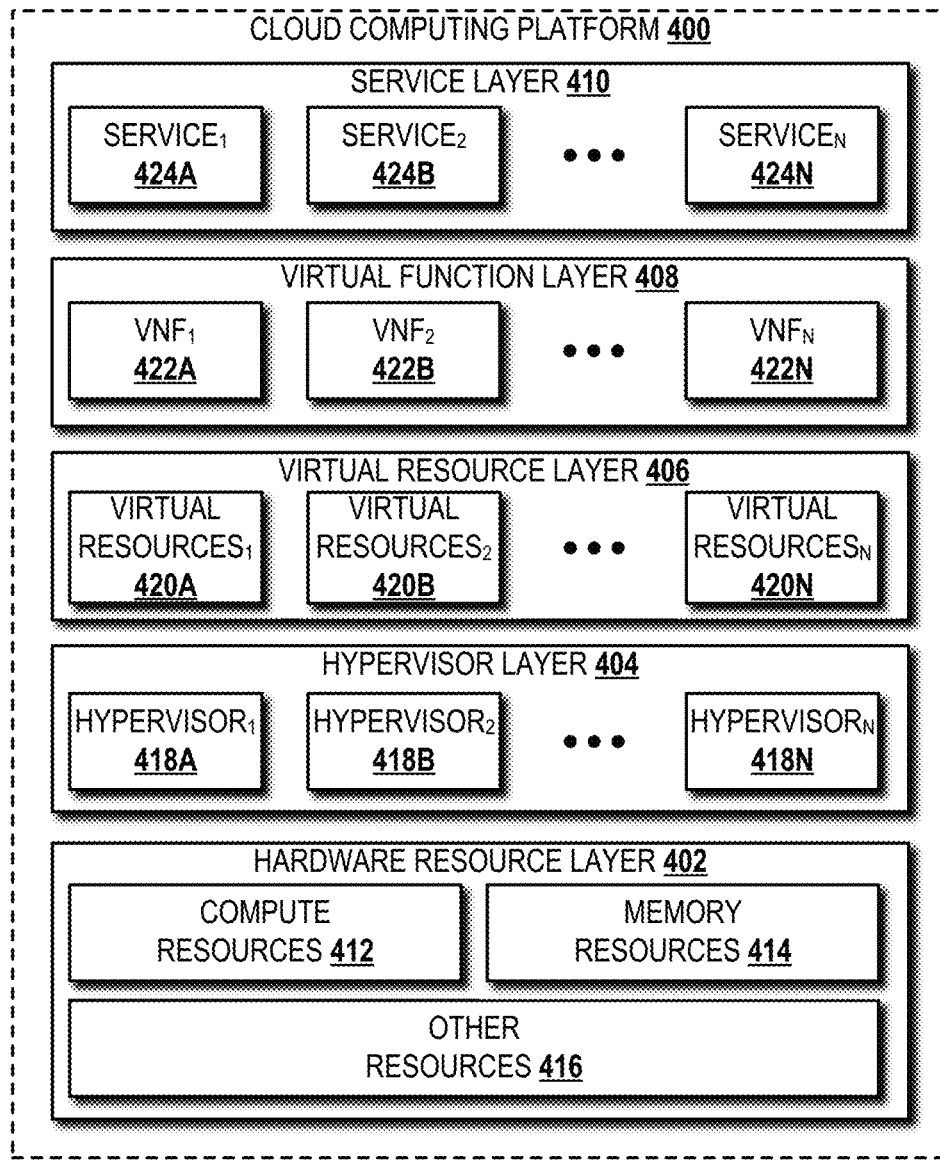
FIG. 4 is a block diagram illustrating a cloud computing platform capable of implementing aspects of the concepts and technologies disclosed herein.

Turning now to FIG. 4, an illustrative cloud computing platform 400 capable of implementing aspects of the cloud environments 144, such as the private cloud environment 146, the public cloud environment 148, the hybrid cloud environment 150, and/or a multi-cloud environment (not shown in FIG. 1), will be described, according to an illustrative embodiment. As used herein, a "private cloud environment" is a cloud environment that is provisioned for use by a select one or more customers. As used herein, a "public cloud network" is a cloud environment that is provisioned for public use (i.e., anyone who wants to use or purchase access). As used herein, a "hybrid cloud network" can include at least two private clouds, at least two public clouds, or at least one private cloud and at least one public cloud. As used herein, a "multi-cloud network" includes any combination of public and/or private clouds from more than one cloud service provider. The cloud environments 144 can provide one or more cloud services such as Infrastructure-as-a-Service ("IaaS"), Platform-as-a-Service ("PaaS"), and/or Software-as-a-Service ("SaaS"), although other cloud services are contemplated.

The illustrated cloud computing platform 400 includes a hardware resource layer 402, a hypervisor layer 404, a virtual resource layer 406, a virtual function layer 408, and a service layer 410. While no connections are shown between the layers illustrated in FIG. 4, it should be understood that some, none, or all of the components illustrated in FIG. 4 can be configured to interact with one other to carry out various functions described herein. In some embodiments, the components are arranged so as to communicate via one or more networks. Thus, it should be understood that FIG. 4 and the remaining description are intended to provide a general understanding of a suitable environment in which various aspects of the embodiments described herein can be implemented and should not be construed as being limiting in any way.

The hardware resource layer 402 provides hardware resources. In the illustrated embodiment, the hardware resource layer 402 includes one or more compute resources 412, one or more memory resources 414, and one or more other resources 416. The compute resource(s) 412 can include one or more hardware components that perform computations to process data and/or to execute computer-executable instructions of one or more application programs, one or more operating systems, and/or other software. In particular, the compute resources 412 can include one or more central processing units ("CPUs") configured with one or more processing cores. The compute resources 412 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the compute resources 412 can include one or more discrete GPUs. In some other embodiments, the compute resources 412 can include CPU and GPU components that are configured in accordance with a co-processing CPU/GPU computing model, wherein the sequential part of an application executes on the CPU and the computationally-intensive part is accelerated by the GPU processing capabilities. The compute resources 412 can include one or more system-on-chip ("SoC") components along with one or more other components, including, for example, one or more of the memory resources 414, and/or one or more of the other resources 416. In some embodiments, the compute resources 412 can be or can include one or more SNAPDRAGON SoCs, available from QUALCOMM of San Diego, California; one or more TEGRA SoCs, available from NVIDIA of Santa Clara, California; one or more HUMMINGBIRD SoCs, available from SAMSUNG of Seoul, South Korea; one or more Open Multimedia Application Platform ("OMAP") SoCs, available from TEXAS INSTRUMENTS of Dallas, Texas; one or more customized versions of any of the above SoCs; and/or one or more proprietary SoCs. The compute resources 412 can be or can include one or more hardware components architected in accordance with an ARM architecture, available for license from ARM HOLDINGS of Cambridge, United Kingdom. Alternatively, the compute resources 412 can be or can include one or more hardware components architected in accordance with an x86 architecture, such an architecture available from INTEL CORPORATION of Mountain View, California, and others. Those skilled in the art will appreciate the implementation of the compute resources 412 can utilize various computation architectures, and as such, the compute resources 412 should not be construed as being limited to any particular computation architecture or combination of computation architectures, including those explicitly disclosed herein.

The memory resource(s) 414 can include one or more hardware components that perform storage/memory operations, including temporary or permanent storage operations. In some embodiments, the memory resource(s) 414 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 412.

The other resource(s) 416 can include any other hardware resources that can be utilized by the compute resources(s) 412 and/or the memory resource(s) 414 to perform operations described herein. The other resource(s) 416 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 402 can be virtualized by one or more hypervisors 418A-418N (also known as "virtual machine monitors") operating within the hypervisor layer 404 to create virtual resources that reside in the virtual resource layer 406. The hypervisors 418A-418N can be or can include software, firmware, and/or hardware that alone or in combination with other software, firmware, and/or hardware, creates and manages virtual resources 420A-420N operating within the virtual resource layer 406.

The virtual resources 420A-420N operating within the virtual resource layer 406 can include abstractions of at least a portion of the compute resources 412, the memory resources 414, and/or the other resources 416, or any combination thereof. In some embodiments, the abstractions can include one or more VMs, virtual volumes, virtual networks, and/or other virtualized resources upon which one or more VNFs 422A-422N can be executed. The VNFs 422A-422N in the virtual function layer 408 are constructed out of the virtual resources 420A-420N in the virtual resource layer 406. In the illustrated example, the VNFs 422A-422N can provide, at least in part, one or more services 424A-424N in the service layer 410.

Figure 5:
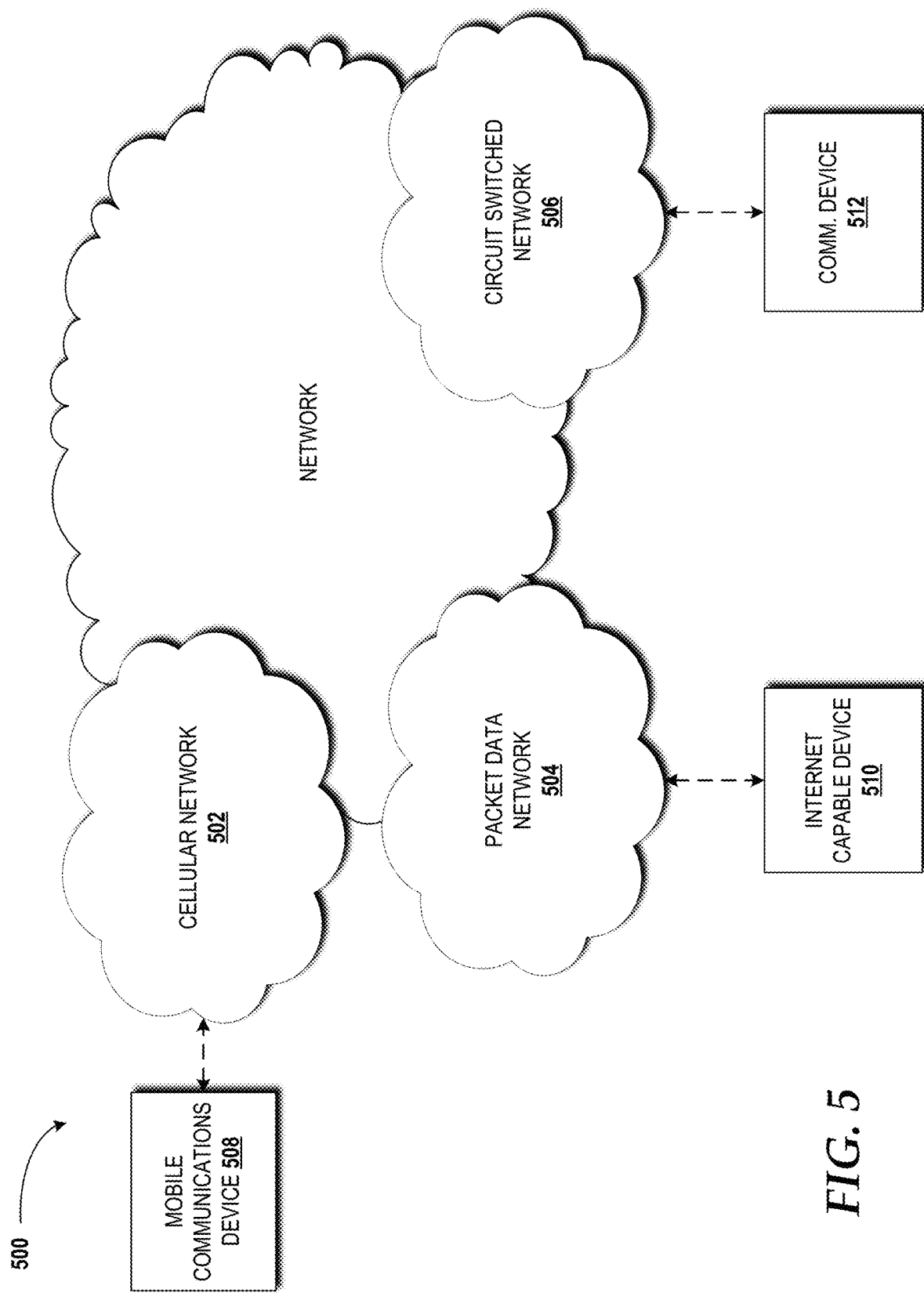
FIG. 5 is a block diagram illustrating an exemplary network capable of implementing, at least in part, aspects of the concepts and technologies disclosed herein.

Turning now to FIG. 5, an example network 500 will be described, according to an illustrative embodiment. In the illustrated embodiment, the network 500 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a mobile device 600 (best shown in FIG. 6), a cellular telephone, a user equipment, a PDA, a laptop computer, a handheld computer, and combinations thereof, can be operatively connected to the cellular network 502. The cellular network 502 can be configured to utilize any using any wireless communications technology or combination of wireless communications technologies, some examples of which include, but are not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other Institute of Electrical and Electronics Engineers ("IEEE") 802.XX technologies, and the like. The mobile communications device 508 can communicate with the cellular network 502 via various channel access methods (which may or may not be used by the aforementioned technologies), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like. Data can be exchanged between the mobile communications device 508 and the cellular network 502 via cellular data technologies such as, but not limited to, General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. It should be understood that the cellular network 502 may additionally include backbone infrastructure that operates on wired communications technologies, including, but not limited to, optical fiber, coaxial cable, twisted pair cable, and the like to transfer data between various systems operating on or in communication with the cellular network 502.

The packet data network 504 can include various devices, servers, computers, databases, and other devices in communication with one another. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet.

The circuit switched network 506 includes various hardware and software for providing circuit switched communications. The circuit switched network 506 may include, or may be, what is often referred to as a plain old telephone system ("POTS"). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable systems/devices 510, such as the user system 122, the FLUTE system 102, the distributed tracing system 108, the cloud environments 144, a personal computer ("PC"), a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. It should be appreciated that substantially all of the functionality described with reference to the network 518 can be performed by the cellular network 502, the packet data network 504, and/or the circuit switched network 506, alone or in combination with additional and/or alternative networks, network elements, and the like.

Figure 6:
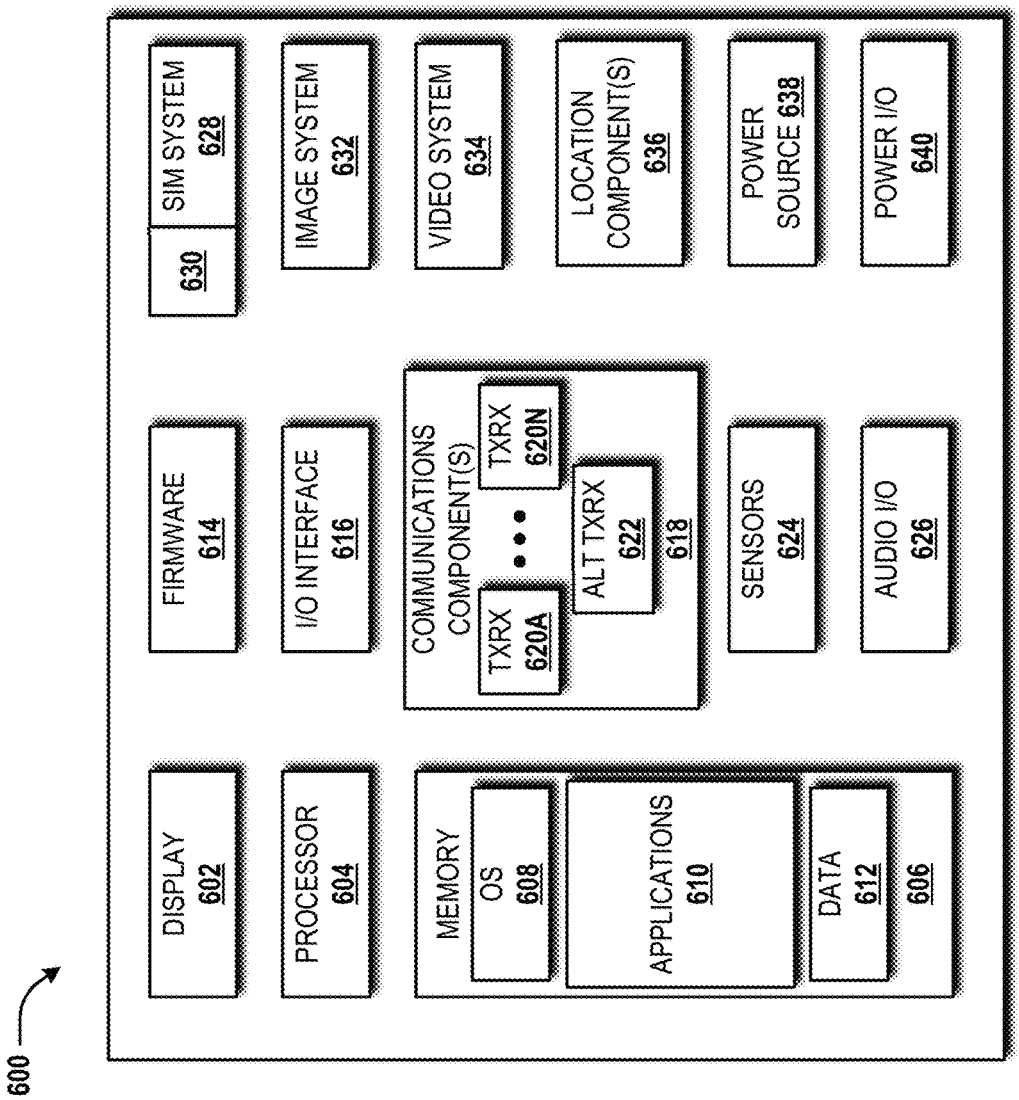
FIG. 6 is a block diagram illustrating an example mobile device and components thereof

Turning now to FIG. 6, an illustrative mobile device 600 and components thereof will be described. In some embodiments, the user system 122 described above can be configured as and/or can have an architecture similar or identical to the mobile device 600 described herein in FIG. 6. While connections are not shown between the various components illustrated in FIG. 6, it should be understood that some, none, or all of the components illustrated in FIG. 6 can be configured to interact with one another to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display data described herein, network connection information, various GUI elements, text, images, video, virtual keypads and/or keyboards, messaging data, notification messages, metadata, Internet content, device status, time, date, calendar data, device preferences, map and location data, combinations thereof, and/or the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610, other computer-executable instructions stored in the memory 606, or the like. In some embodiments, the applications 610 also can include a UI application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in data communications, entering/deleting data, entering and setting user IDs and passwords for device access, configuring settings, manipulating content and/or settings, multimode interaction, interacting with other applications 610, and otherwise facilitating user interaction with the operating system 608, the applications 610, and/or other types or instances of data 612 that can be stored at the mobile device 600.

The applications 610, the data 612, and/or portions thereof can be stored in the memory 606 and/or in a firmware 614, and can be executed by the processor 604. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, presence status information, user IDs, passwords, and application initiation (start-up) requests. In some embodiments, the I/O interface 616 can include a hardwire connection such as a universal serial bus ("USB") port, a mini-USB port, a micro-USB port, an audio jack, a PS2 port, an IEEE 1364 ("FIREWIRE") port, a serial port, a parallel port, an Ethernet (RJ45) port, an RJ11 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments, one or more of the transceivers of the communications component 618 may be configured to communicate using GSM, CDMAONE, CDMA2000, LTE, and various other 2G, 2.5G, 3G, 4G, 4.5G, 5G, and greater generation technology standards. Moreover, the communications component 618 may facilitate communications over various channel access methods (which may or may not be used by the aforementioned standards) including, but not limited to, TDMA, FDMA, W-CDMA, OFDM, SDMA, and the like.

In addition, the communications component 618 may facilitate data communications using GPRS, EDGE, the HSPA protocol family including HSDPA, EUL or otherwise termed HSDPA, HSPA+, and various other current and future wireless data access standards. In the illustrated embodiment, the communications component 618 can include a first transceiver ("TxRx") 620A that can operate in a first communications mode (e.g., GSM). The communications component 618 also can include an Nth transceiver ("TxRx") 620N that can operate in a second communications mode relative to the first transceiver 620A (e.g., UMTS). While two transceivers 620A-620N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from global positioning system ("GPS") devices, assisted-GPS ("A-GPS") devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 600 or other devices or computers described herein, such as the computer system 600 described above with reference to FIG. 6. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 600 in order to store and execute the software components presented herein. It is also contemplated that the mobile device 600 may not include all of the components shown in FIG. 6, may include other components that are not explicitly shown in FIG. 6, or may utilize an architecture completely different than that shown in FIG. 6.

Figure 7:
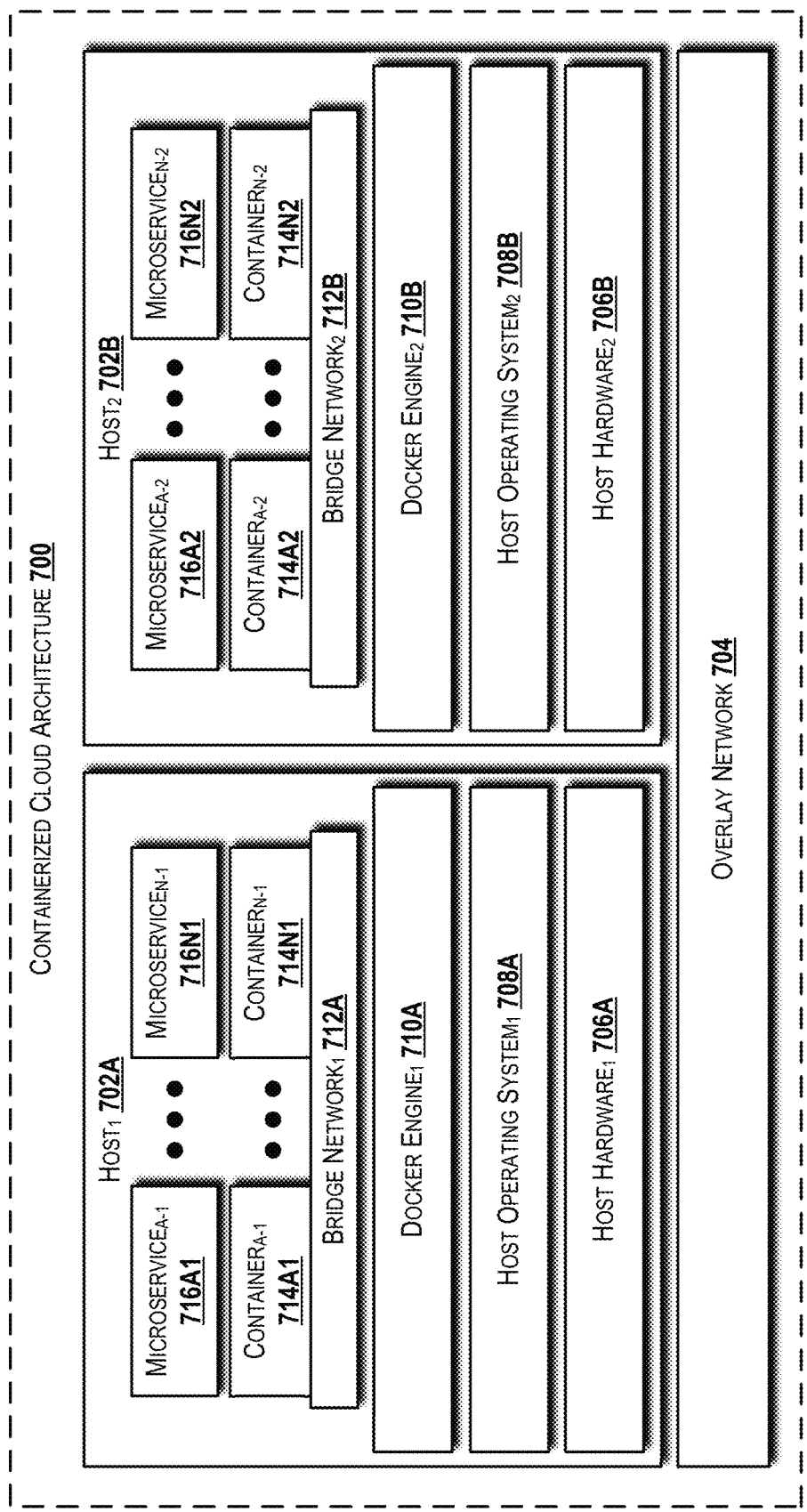
FIG. 7 is a block diagram illustrating an exemplary containerized cloud architecture capable of implementing, at least in part, aspects of the concepts and technologies disclosed herein.

Turning now to FIG. 7, a block diagram illustrating an exemplary containerized cloud architecture 700 capable of implementing, at least in part, aspects of the concepts and technologies disclosed herein will be described, according to an illustrative embodiment. The containerized cloud architecture 700 can be implemented, at least in part, by one or more of the cloud environments 144.

The illustrated containerized cloud architecture 700 includes a first host ("host$_1$") 702A and a second host ("host$_2$") 702B (at times referred to herein collectively as hosts 702 or individually as host 702) that can communicate via an overlay network 704. Although two hosts 702 are shown, the containerized cloud architecture 700 can support any number of hosts 702. The overlay network 704 can enable communication among hosts 702 in the same cloud network or hosts 702 across different cloud networks. Moreover, the overlay network 704 can enable communication among hosts 702 owned and/or operated by the same or different entities.

The illustrated host 702A includes a host hardware$_1$ 706A, a host operating system$_1$ 708A, a DOCKER engine$_1$ 710A, a bridge network$_1$ 712A, container$_{A-1}$ through container$_{N-1}$ 714A1-714N1, and microservice$_{A-1}$ through microservice$_{N-1}$ 716A1-716N1. Similarly, the illustrated host$_2$ 702B includes a host hardware$_2$ 706B, a host operating system$_2$ 708B, a DOCKER engine$_2$ 710B, a bridge network$_2$ 712B, container$_{A-2}$ through container$_{N-2}$ 714A2-714N2, and microservice$_{A-2}$ through microservice$_{N-2}$ 716A2-716N2.

The host hardware$_1$ 706A and the host hardware$_2$ 706B (at times referred to herein collectively or individually as host hardware 706) can be implemented as bare metal hardware such as one or more physical servers. The host hardware 706 alternatively can be implemented using hardware virtualization. In some embodiments, the host hardware 706 can include compute resources, memory resources, and other hardware resources. These resources can be virtualized according to known virtualization techniques. A cloud computing platform 400 is described herein with reference to FIG. 4. Although the containerized cloud architecture 700 and the cloud computing platform 400 are described separately, these architectures can be combined to provide a hybrid containerized/virtualized cloud architecture. Those skilled in the art will appreciate that the disclosed cloud architectures are simplified for ease of explanation and can be altered as needed for any given implementation without departing from the scope of the concepts and technologies disclosed herein. As such, the containerized cloud architecture 700 and the cloud computing platform 400 should not be construed as being limiting in any way.

Compute resources can include one or more hardware components that perform computations to process data and/or to execute computer-executable instructions. For example, the compute resources can execute instructions of the host operating system$_1$ 708A and the host operating system$_2$ 708B (at times referred to herein collectively as host operating systems 708 or individually as host operating system 708), the containers 714A1-714N1 and the containers 714A2-714N2 (referred to collectively as "containers 714" or individually as "container 714"), and the microservices 716A1-716N1 and the microservices 716A2-716N2 (referred to collectively as "microservices 716" or individually as "microservice 716").

The compute resources of the host hardware 706 can include one or more central processing units ("CPUs") configured with one or more processing cores. The compute resources can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources can include one or more discrete GPUs. In some other embodiments, the compute resources can include CPU and GPU components that are configured in accordance with a co-processing CPU/GPU computing model, wherein the sequential part of an application executes on the CPU and the computationally-intensive part is accelerated by the GPU. The compute resources can include one or more system-on-chip ("SoC") components along with one or more other components, including, for example, one or more memory resources, and/or one or more other resources. In some embodiments, the compute resources can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources can be or can include one or more hardware components architected in accordance with an advanced reduced instruction set computing ("RISC") ("ARM") architecture, available for license from ARM HOLDINGS. Alternatively, the compute resources can be or can include one or more hardware components architected in accordance with an x86 architecture, such an architecture available from INTEL CORPORATION, and others. Those skilled in the art will appreciate the implementation of the compute resources can utilize various computation architectures, and as such, the compute resources should not be construed as being limited to any particular computation architecture or combination of computation architectures, including those explicitly disclosed herein.

The memory resources of the host hardware 706 can include one or more hardware components that perform storage operations, including temporary or permanent storage operations. In some embodiments, the memory resource(s) include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources.

The other resource(s) of the host hardware 706 can include any other hardware resources that can be utilized by the compute resources(s) and/or the memory resource(s) to perform operations described herein. The other resource(s) can include one or more input and/or output processors (e.g., network interface controller or wireless radio), one or more modems, one or more codec chipset, one or more pipeline processors, one or more fast Fourier transform ("FFT")

processors, one or more digital signal processors ("DSPs"), one or more speech synthesizers, and/or the like.

The host operating systems 708 can be proprietary, open source, or closed source. In some embodiments, the host operating systems 708 can be or can include one or more container operating systems designed specifically to host containers such as the containers 714. For example, the host operating systems 708 can be or can include FEDORA COREOS (available from RED HAT, INC), RANCHEROS (available from RANCHER), and/or BOTTLEROCKET (available from Amazon Web Services). In some embodiments, the host operating systems 708 can be or can include one or more members of the WINDOWS family of operating systems from MICROSOFT CORPORATION (e.g., WINDOWS SERVER), the LINUX family of operating systems (e.g., CENTOS, DEBIAN, FEDORA, ORACLE LINUX, RHEL, SUSE, and UBUNTU), the SOLARIS family of operating systems from ORACLE CORPORATION, other operating systems, and the like.

The containerized cloud architecture 700 can be implemented utilizing any containerization technologies. Presently, open-source container technologies, such as those available from DOCKER, INC., are the most widely used, and it appears will continue to be for the foreseeable future. For this reason, the containerized cloud architecture 700 is described herein using DOCKER container technologies available from DOCKER, INC., such as the DOCKER engines 710. Those skilled in the art will appreciate that other container technologies may also be applicable to implementing the concepts and technologies disclosed herein, and as such, the containerized cloud architecture 700 is not limited to DOCKER container technologies. Moreover, although open-source container technologies are most widely used, the concepts and technologies disclosed here may be implemented using proprietary technologies or closed source technologies.

The DOCKER engines 710 are based on open source containerization technologies available from DOCKER, INC. The DOCKER engines 710 enable users (not shown) to build and containerize applications. The full breadth of functionality provided by the DOCKER engines 710 and associated components in the DOCKER architecture are beyond the scope of the present disclosure. As such, the primary functions of the DOCKER engines 710 will be described herein in brief, but this description should not be construed as limiting the functionality of the DOCKER engines 710 or any part of the associated DOCKER architecture. Instead, those skilled in the art will understand the implementation of the DOCKER engines 710 and other components of the DOCKER architecture to facilitate building and containerizing applications within the containerized cloud architecture 700.

The DOCKER engine 710 functions as a client-server application executed by the host operating system 708. The DOCKER engine 710 provides a server with a daemon process along with application programming interfaces ("APIs") that specify interfaces that applications can use to communicate with and instruct the daemon to perform operations. The DOCKER engine 710 also provides a command line interface ("CLI") that uses the APIs to control and interact with the daemon through scripting and/or CLI commands. The daemon can create and manage objects such as images, containers, networks, and volumes. Although a single DOCKER engine 710 is illustrated in each of the hosts 702, multiple DOCKER engines 710 are contemplated. The DOCKER engine(s) 710 can be run in swarm mode.

The bridge networks 712 enable the containers 714 connected to the same bridge network to communicate. For example, the bridge network$_1$ 712A enables communication among the containers 714A1-714N1, and the bridge network$_2$ 712B enables communication among the containers 714A2-714N2. In this manner, the bridge networks 712 isolate the containers 714A1-714N1 from the containers 714A2-714N2 to prevent direct communication. In some embodiments, the bridge networks 712 are software network bridges implemented via the DOCKER bridge driver. The DOCKER bridge driver enables default and user-defined network bridges.

The containers 714 are runtime instances of images. The containers 714 are described herein specifically as DOCKER containers, although other containerization technologies are contemplated as noted above. Each container 714 can include an image, an execution environment, and a standard set of instructions.

The microservices 716 are applications that provide a single function. In some embodiments, each of the microservices 716 is provided by one of the containers 714, although each of the containers 714 may contain multiple microservices 716. The microservices 716 can provide any type of functionality, and therefore all the possible functions cannot be listed herein. Those skilled in the art will appreciate the use of the microservices 716 along with the containers 714 to improve many aspects of the containerized cloud architecture 700, such as reliability, security, agility, and efficiency, for example.

Based on the foregoing, it should be appreciated that aspects of distributed tracing leveraging event logs have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
presenting, by a flow logging utility tracer ("FLUTE") system comprising a processor, a FLUTE user interface;
receiving, by the FLUTE system, via the FLUTE user interface, a trace request, wherein the trace request includes an identifier;
interfacing, by the FLUTE system, via a FLUTE controller, with at least one FLUTE adapter of a plurality of FLUTE adapters, wherein the at least one FLUTE adapter corresponds to a cloud environment that is associated with the trace request, and wherein each of the plurality of FLUTE adapters corresponds to a different cloud environment;
extracting, by the FLUTE system, via the FLUTE adapter, event log data from a log repository corresponding to the cloud environment associated with the trace request, wherein at least a portion of the event log data is generated based on processing of the trace request by the cloud environment, and wherein at least the portion of the event log data is associated with the identifier from the trace request; and generating, by the FLUTE system, via a FLUTE stitcher, tracing data based upon the event log data, wherein generating the tracing data based upon the event log data comprises correlating, by the FLUTE stitcher, at least the portion of the event log data based on the identifier from the trace request to generate the tracing data.

2. The method of claim 1, further comprising:
filtering, by the FLUTE system, via the FLUTE adapter, the event log data according to a logging specification, thereby creating filtered event log data; and
transforming, by the FLUTE system, the filtered event log data for compatibility with the FLUTE stitcher.

3. The method of claim 2, further comprising:
preparing, by the FLUTE system, via the FLUTE stitcher, the tracing data for publication to a distributed tracing system; and
publishing, by the FLUTE system, via the FLUTE stitcher, the tracing data to the distributed tracing system for storage.

4. The method of claim 3, wherein the identifier is enforced by the logging specification, and wherein the logging specification is an ECOMP logging specification.

5. The method of claim 3, further comprising:
obtaining, by the FLUTE system, via the FLUTE user interface, the tracing data from the distributed tracing system; and
presenting, by the FLUTE system, a visualization of the tracing data.

6. The method of claim 5, wherein the tracing data comprises at least one trace and the at least one trace comprises at least one span.

7. The method of claim 1, wherein the identifier comprises a transaction ID.

8. The method of claim 1, wherein the cloud environment comprises a public cloud environment, a private cloud environment, or a hybrid cloud environment.

9. A flow logging utility tracer ("FLUTE") system comprising:
a processor; and
a memory comprising instructions that, when executed by the processor, cause the processor to perform operations comprising
presenting a FLUTE user interface,
receiving, via the FLUTE user interface, a trace request, wherein the trace request includes an identifier,
interfacing, via a FLUTE controller, with at least one FLUTE adapter of a plurality of FLUTE adapters, wherein the at least one FLUTE adapter corresponds to a cloud environment that is associated with the trace request, and wherein each of the plurality of FLUTE adapters corresponds to a different cloud environment,
extracting, via the FLUTE adapter, event log data from a log repository corresponding to the cloud environment associated with the trace request, wherein at least a portion of the event log data is generated based on processing of the trace request by the cloud environment, and wherein at least the portion of the event log data is associated with the identifier from the trace request, and generating, via a FLUTE stitcher, tracing data based upon the event log data, wherein generating the tracing data based upon the event log data comprises correlating, by the FLUTE stitcher, at least the portion of the event log data based on the identifier from the trace request to generate the tracing data.

10. The FLUTE system of claim 9, wherein the operations further comprise:
filtering, via the FLUTE adapter, the event log data according to a logging specification, thereby creating filtered event log data; and
transforming, via the FLUTE adapter, the filtered event log data for compatibility with the FLUTE stitcher.

11. The FLUTE system of claim 10, wherein the operations further comprise:
preparing, via the FLUTE stitcher, the tracing data for publication to a distributed tracing system; and
publishing, via the FLUTE stitcher, the tracing data to the distributed tracing system for storage.

12. The FLUTE system of claim 11, wherein the identifier is enforced by the logging specification, and wherein the logging specification is an ECOMP logging specification.

13. The FLUTE system of claim 11, wherein the operations further comprise:
obtaining, via the FLUTE user interface, the tracing data from the distributed tracing system; and
presenting a visualization of the tracing data.

14. The FLUTE system of claim 13, wherein the tracing data comprises at least one trace and the at least one trace comprises at least one span.

15. A computer-readable storage medium comprising computer-executable instructions that, when executed by a processor, cause the processor to perform operations comprising:
presenting a FLUTE user interface;
receiving, via the FLUTE user interface, a trace request, wherein the trace request includes an identifier;
interfacing, via a FLUTE controller, with at least one FLUTE adapter of a plurality of FLUTE adapters, wherein the at least one FLUTE adapter corresponds to a cloud environment that is associated with the trace request, and wherein each of the plurality of FLUTE adapters corresponds to a different cloud environment;
extracting, via the FLUTE adapter, event log data from a log repository corresponding to the cloud environment associated with the trace request, wherein at least a portion of the event log data is generated based on processing of the trace request by the cloud environment, and wherein at least the portion of the event log data is associated with the identifier from the trace request; and
generating, via a FLUTE stitcher, tracing data based upon the event log data, wherein generating the tracing data based upon the event log data comprises correlating, by the FLUTE stitcher, at least the portion of the event log data based on the identifier from the trace request to generate the tracing data.

16. The computer-readable storage medium of claim 15, wherein the operations further comprise:
filtering, via the FLUTE adapter, the event log data according to a logging specification, thereby creating filtered event log data; and
transforming, via the FLUTE adapter, the filtered event log data for compatibility with the FLUTE stitcher.

17. The computer-readable storage medium of claim 16, wherein the operations further comprise:
  preparing, via the FLUTE stitcher, the tracing data for publication to a distributed tracing system; and
  publishing, via the FLUTE stitcher, the tracing data to the distributed tracing system for storage.

18. The computer-readable storage medium of claim 17, wherein the identifier is enforced by the logging specification, and wherein the logging specification is an ECOMP logging specification.

19. The computer-readable storage medium of claim 17, wherein the operations further comprise:
  obtaining, via the FLUTE user interface, the tracing data from the distributed tracing system; and
  presenting a visualization of the tracing data.

20. The computer-readable storage medium of claim 19, wherein the tracing data comprises at least one trace and the at least one trace comprises at least one span.

* * * * *